March 28, 1944.  W. OWEN  2,345,356
PROCESS OF MANUFACTURING MIRRORS
Original Filed Dec. 21, 1939  3 Sheets—Sheet 1
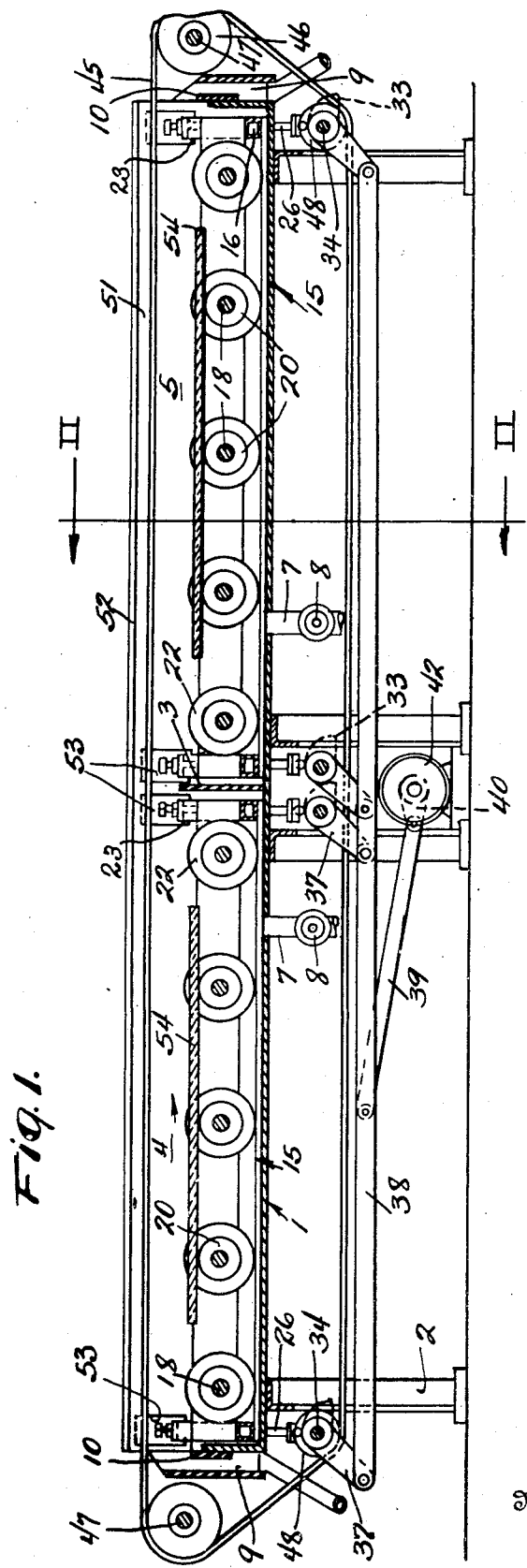
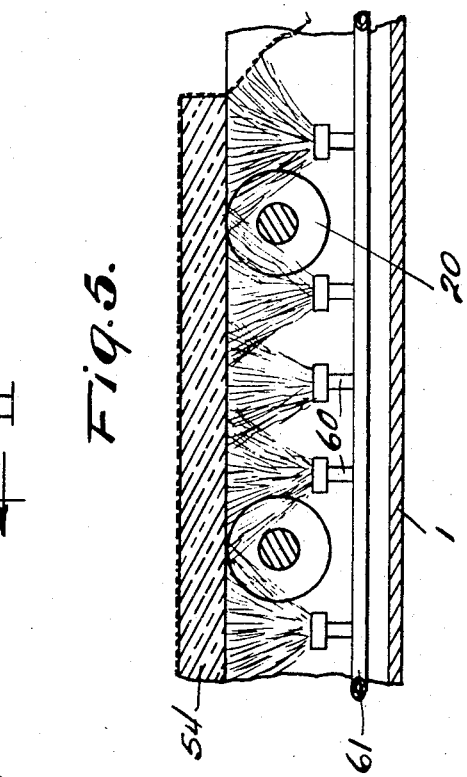
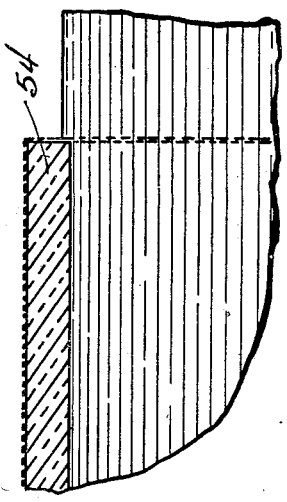
Inventor
WILLIAM OWEN
By Olen E. Bee
Attorney

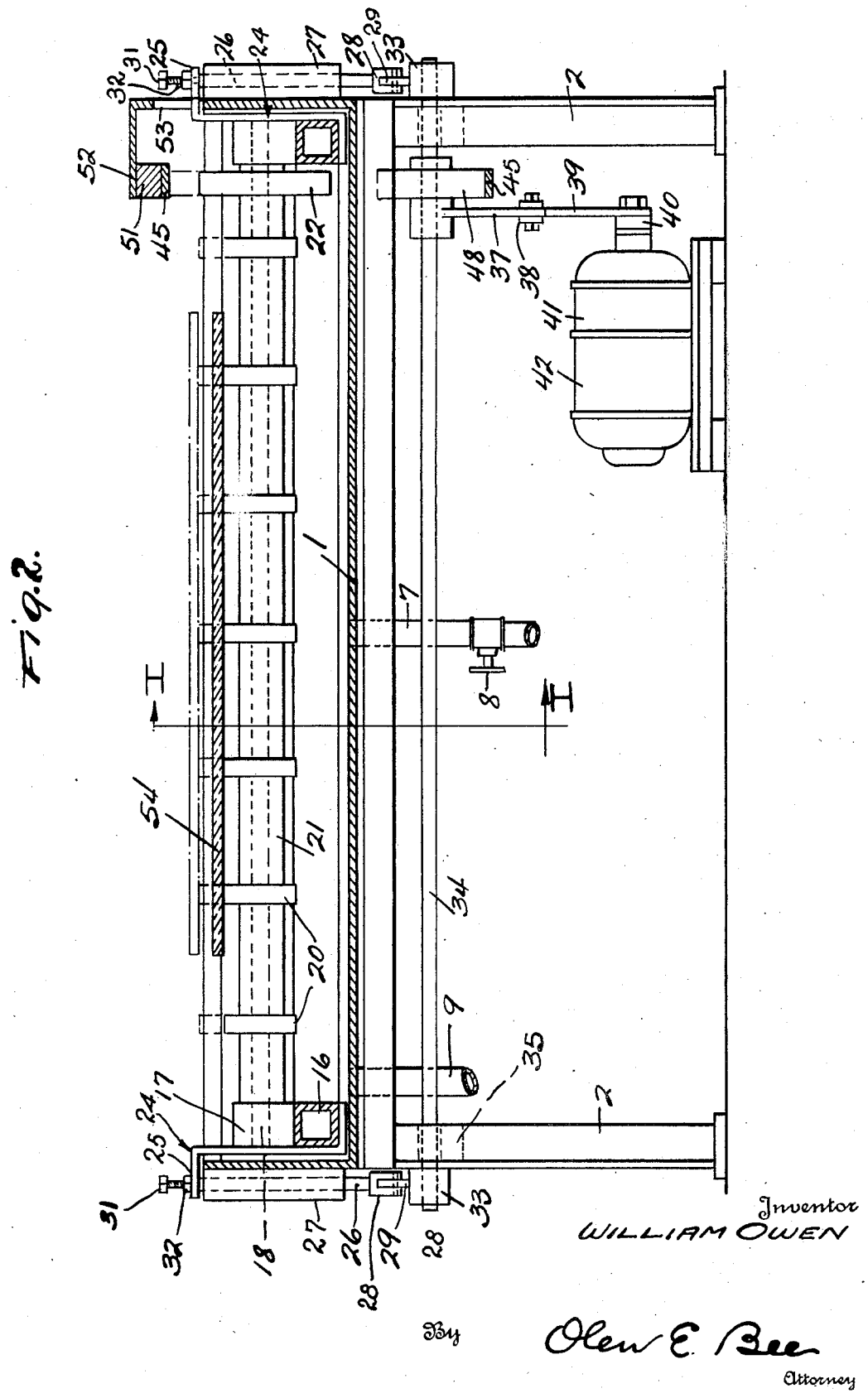

March 28, 1944. W. OWEN 2,345,356
PROCESS OF MANUFACTURING MIRRORS
Original Filed Dec. 21, 1939 3 Sheets-Sheet 3
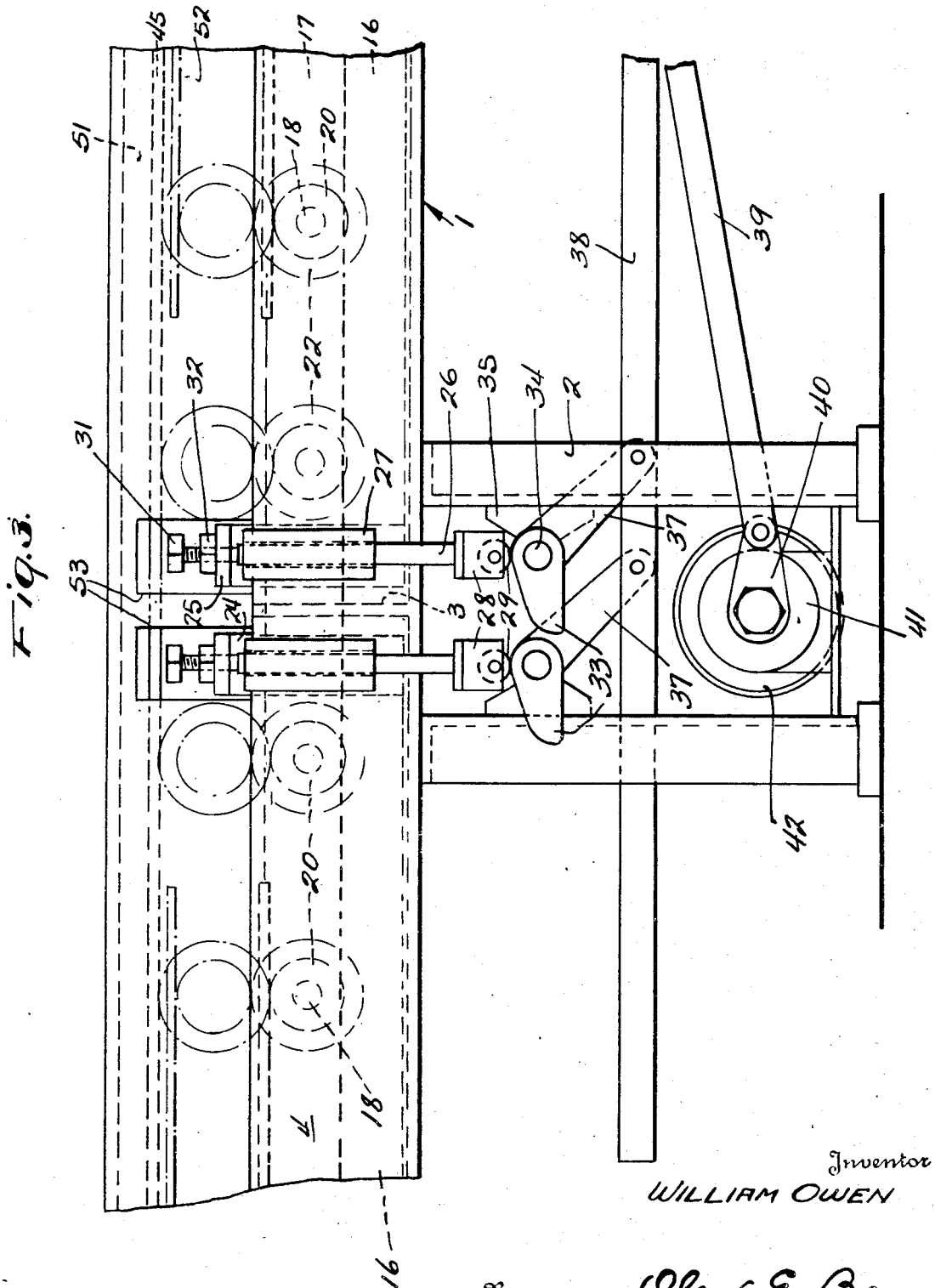
Inventor
WILLIAM OWEN
By Olen E. Bee
Attorney Patented Mar. 28, 1944

2,345,356

UNITED STATES PATENT OFFICE 2,345,356

PROCESS OF MANUFACTURING MIRRORS

William Owen, Pittsburgh, Pa., assignor to Pittsburgh Plate Glass Company, Allegheny County, Pa., a corporation of Pennsylvania Original application December 21, 1939, Serial No. 310,408. Divided and this application December 19, 1940, Serial No. 370,775

4 Claims. (Cl. 117—35)

The present invention relates to an improved process of depositing metallic reflecting surfaces upon glass plates, and constitutes a division of my application Serial No. 310,408, filed December 21, 1939.

The primary object of the present invention is the provision of a process which will permit a more rapid preparation of mirror plates than has heretofore been possible.

A second object of the invention is the provision of means whereby the deposited metallic film is restricted to one surface of the glass plate and the possibility of metal depositing upon the opposite surface, from which it would have to be removed, is entirely eliminated.

Other objects and advantages of the invention will become more apparent from the following detailed description of certain preferred embodiments thereof.

Briefly stated, the present invention contemplates the silvering of glass plates while maintaining a positive fluid contact upon the surface of such plates opposite the plating and which will flush away or strongly dilute the solutions to prevent the treating solutions from creeping back on such under surfaces, thereby contaminating them.

In the accompanying drawings, illustrative of my invention,

Figure 1 is a vertical section of one form of the apparatus, taken substantially along the line I—I of Fig. 2;

Figure 2 is a vertical sectional view taken substantially along the line II—II of Fig. 1;

Figure 3 is a fragmentary side elevation, on a larger scale, of portions of the apparatus including the drive mechanism, for raising and lowering the glass-carrying frame;

Figure 4 is a fragmentary sectional view showing a glass plate as positioned during the silvering operation;

Figure 5 is a fragmentary vertical sectional view of a second form of the apparatus.

Referring to Figures 1 to 4 of the drawings, a tank 1, secured to a suitable supporting understructure, including vertical standards 2, is divided by a section wall 3 into two identical compartments 4 and 5. Each compartment is provided with a water inlet 7 controlled by valves 8 and outlet drains 9 in which adjustable dams 10 regulate the height of the bath of water within the tank.

Each section of the tank has positioned therein a frame 15 comprising spaced parallel members 16 to which are secured at intervals bearings 17 in which are mounted shafts 18. Work-supporting discs 20 of rubber or other suitable material are secured to each shaft at intervals therealong, being separated by spacers 21 and at one end of each shaft a driving disc 22 is secured. The frames 15 are secured at each corner to lifting arms 24 substantially of Z-shape in cross-section, as best illustrated in Fig. 2. One section 25 of the lifting arm extends over the tank wall and engages a tappet rod 26 extending through a guide block 27, secured to the tank wall, and ending in a fork 28, in which is mounted a wheel 29. The arm 24 is provided with a screw 31, extending therethrough and contacting the upper end of the tappet rod 26, to permit accurate adjustment of the level of the frame. A nut 32 insures a positive lock of the screw 31 after adjustment thereof.

Cams 33 engaging wheels 29 and actuating the tappet rods 26 are secured to cross-shafts 34, journaled in bearings 35, secured to the vertical supports 2 of the tank 1. The shafts 34 also carry levers 37, which are pivotally secured to a pull rod 38, which in turn is provided with a link 39 pivotally secured to a crank 40, which is actuated through the gear reducer 41 and the motor 42.

A transmission belt 45 extends the full length of the tank, passing over rolls 46 rigidly secured to shafts 47 that are supported upon the tank and one of which is rotatable, driven in any suitable manner from one of the conveyor sections and the belt also extends over rolls 48, which rotate freely upon the cross-shafts 34. A belt shoe 51 mounted upon an angle member 52, forming an extension of the tank wall insures proper spacing of the belt 45 for the driving discs 22. Openings 53 in the angle member 52 provide clearance for the lifting arms 24.

In operation, the valves 8 are opened to permit the tank sections 4 and 5 to fill with distilled or tap water. The motor 42 actuates the pull rod 38, turning the cams 33 through an angle of 90 degrees, to lift the rods 26, thus raising the frames 15 to the level shown in dotted line in Fig. 2 until the driving discs 22 contact the drive belt 45. The rotation of the rolls 20 permit a glass plate 54 to be moved onto the frame in section 4 of the tank from a suitable conveyor, not shown, lying to the left side of the tank. A reverse movement of the pull rod 38 returns the cams to their original position, thus lowering the tappet rods and the frames 15 until the under surface of the glass plate 54, as shown in Fig. 4, is submerged beneath the water level of the tank and thus creates an appreciable liquid pressure on such glass surface. The lowering of the frame, of course, disengages the driving discs 22 from the transmission belt 45 and the plate 54 will be stationary. In this position the exposed or upper surface of the glass plate 54 may be given the preliminary treatment with a sensitizing solution of stannous chloride. Excesses of the treating solution flowing over the edge of the plate are dissipated in the water and cannot creep back onto the under surface of the plate, thereby contaminatin such surface. The glass plate is firmly supported, permitting the sensitizing solution to be blocked and thereafter the surface may be rinsed, the water level in the tank remaining constant.

The frames are then lifted again by operating the motor 42, whereby the sensitized plate 54 in section 4 of the tank is transported to the second tank section while a fresh glass plate is moved into the first section. The frames are lowered and while the new plate is being sensitized, the silvering solutions are mixed and poured over the treated plate in section 5. Here also the excesses of the silvering solution, when running over the edges of the plate, fall into the water bath and are dissipated therein. Further operation of the apparatus lifts the frames, the silvered plate is transported from the tank onto a second conveyor, not shown, but which lies to the right of the apparatus, the sensitized plate in the first section of the tank moves to the second section, while a fresh glass plate is moved into the first section. This intermittent action continues throughout the entire operation.

If it is desired the bath for protecting the mirrors can be in the form of sprays of fluid, as shown in Fig. 5. Therein a plurality of water sprayers 60, fed from the conduit 61, are directed under desired pressure against the under surface of the glass plate 54 as it rests upon the frame 15. Excesses of the treating solution creeping over the edge of the plate are carried outwardly and will not contact the under surface of the plate.

It will be seen that the glass plates do not have to be touched from the time they enter the apparatus until the deposited metallic coating has had an opportunity to dry. In addition, the fluid, which prevents contamination of the under surfaces of the glass plates, can be heated or cooled as desired, to afford a ready control of the temperature of the glass, thus facilitating the deposition of silver thereon.

It will at once be apparent that various modifications in the form of the apparatus are possible without departing from the spirit of the invention or the scope of the appended claims.

What I claim is:

1. A process of silvering mirrors which comprises immersing one surface of a glass plate in water and applying successively a stannous chlorid solution as a sensitizing agent and then a silvering solution having the capacity of laying down a film of metallic silver, to the exposed surface of the plate while the first-mentioned surface is immersed in the water, the water being in an amount sufficient to dissipate the silvering solution to such extent as to obviate the deposition of silver upon the immersed surface.

2. A process of silvering a mirror which comprises applying silvering solutions to one surface of a glass plate and directing sprays of water against the opposite surface of the plate to dissipate silvering solutions creeping over the edge.

3. A process of treating a glass plate to form a mirror film upon one surface thereof without correspondingly depositing a mirror film upon the marginal portions of the opposite face, which process comprises applying a silvering solution having the capacity of laying down a film of silver upon glass to the first-mentioned face to deposit said mirror film, submerging the opposite side of the plate in water while the solutions are being applied to dissipate any silvering solution creeping over said marginal portions, whereby to prevent it from depositing silver upon the said opposite side of the plate.

4. In the process of silvering a glass plate to form a mirror by applying a stannous chlorid solution to one surface of the plate as a sensitizing agent, then rinsing the surface and applying a silvering solution to said surface to deposit a film of silver, the step comprising contacting the remaining surface with water during at least one of the operations of sensitizing and silvering, in order to prevent deposition of silver upon said remaining surface.

WILLIAM OWEN.